(12) United States Patent
Fujimaki

(10) Patent No.: US 7,934,100 B2
(45) Date of Patent: Apr. 26, 2011

(54) INFORMATION PROCESSING SYSTEM, INFORMATION PROCESSING APPARATUS, INFORMATION PROCESSING METHOD, AND STORAGE MEDIUM

(75) Inventor: Yoshihiro Fujimaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1035 days.

(21) Appl. No.: 11/687,811

(22) Filed: Mar. 19, 2007

(65) Prior Publication Data

US 2008/0082831 A1     Apr. 3, 2008

(30) Foreign Application Priority Data

Sep. 28, 2006   (JP) ................................. 2006-265853

(51) Int. Cl.
*G06F 21/00*   (2006.01)
(52) U.S. Cl. ........................ 713/178; 713/168
(58) Field of Classification Search .................. 713/178, 713/168
See application file for complete search history.

(56) References Cited

U.S. PATENT DOCUMENTS

2002/0091928 A1*   7/2002   Bouchard et al. ............. 713/178
2005/0160272 A1*   7/2005   Teppler ........................ 713/178

FOREIGN PATENT DOCUMENTS

JP          2005284901       * 10/2005
JP          2005286443         10/2005

* cited by examiner

*Primary Examiner* — Nasser Moazzami
*Assistant Examiner* — Lisa Lewis
(74) *Attorney, Agent, or Firm* — Gauthier & Connors LLP

(57) ABSTRACT

An information processing system includes a unit that selects a time stamp authority to which a request for generation of a time stamp, the time stamp authority to be selected is different from a time stamp authority selected in a last selection process which has been performed; a unit that acquires the time stamp from the selected time stamp authority; a unit that generates link information specifying an order in which time stamps; a controller that causes verification information including the time stamp, identification information of the time stamp authority, the link information, that are associated with each other; a unit that receives a time stamp verification request with regard to digital data; and a unit that compares an invalidated time stamp applied to digital data to be verified with a time stamp to thereby specify a time range in which the invalidated time stamp is applied.

13 Claims, 8 Drawing Sheets

EXAMPLE DATA STRUCTURE OF VERIFICATION INFORMATION

| No. | DOCUMENT | TIME STAMP | LINK INFORMATION | TIME STAMP AUTHORITY |
|---|---|---|---|---|
| 1 | $D_1$ | $T_1$ | $L_1$ | TSA1 |
| 2 | $D_2$ | $T_2$ | $L_2$ | TSA2 |
| 3 | $D_3$ | $T_3$ | $L_3$ | TSA3 |
| 4 | $D_4$ | $T_4$ | $L_4$ | TSA1 |
| . | . | . | . | . |
| . | . | . | . | . |
| . | . | . | . | . |
| n | $D_n$ | $T_n$ | $L_n$ | TSAn |

| CERTIFICATE ID | ISSUER | SERIAL NUMBER | SIGNATURE ALGORITHM |
|---|---|---|---|
| TSA_a | CA_p | 0011 | Sha1RSA |
| TSA_b | CA_q | 0022 | Sha1RSA |
| TSA_c | CA_r | 0033 | Sha1RSA |
| TSA_d | CA_s | 0044 | Sha1RSA |

EXAMPLE DATA STRUCTURE OF VERIFICATION INFORMATION

| No. | DOCUMENT | TIME STAMP | LINK INFORMATION | TIME STAMP AUTHORITY |
|---|---|---|---|---|
| 1 | $D_1$ | $T_1$ | $L_1$ | TSA1 |
| 2 | $D_2$ | $T_2$ | $L_2$ | TSA2 |
| 3 | $D_3$ | $T_3$ | $L_3$ | TSA3 |
| 4 | $D_4$ | $T_4$ | $L_4$ | TSA1 |
| . | . | . | . | . |
| . | . | . | . | . |
| . | . | . | . | . |
| n | $D_n$ | $T_n$ | $L_n$ | TSAn |

Fig. 11

INFORMATION PROCESSING SYSTEM, INFORMATION PROCESSING APPARATUS, INFORMATION PROCESSING METHOD, AND STORAGE MEDIUM

CROSS-REFERENCE TO RELATED APPLICATIONS

This application is based on and claims priority under 35 USC 119 from Japanese Patent Application No. 2006-265853, filed on Sep. 28, 2006.

BACKGROUND

1. Technical Field

The present invention relates to an information processing system, an information processing apparatus, an information processing method, and a storage medium.

2. Related Art

When digital data such as an electronic file is created on a computer, the time at which the digital data was created (hereinafter referred to the creation time) is set as attribute information of the digital data. Here, while the creation time is originally considered to be attribute information that should not be changed, it is actually possible to rewrite the creation time in a manner similar to normal data. Specifically, as digital data can be created freely as having time in the past or time in the future, when the digital data was actually created cannot be guaranteed by attribute information alone.

In order to deal with the above disadvantage, at present, time stamp authorities are established to perform time authentication of digital data by third party authorities. More specifically, receiving a time stamp request including a digest of digital data that is transmitted by a user, a time stamp authority adds time information to the transmitted digest and further applies a digital signature to the digest using a private key of the time stamp authority. The time stamp authority then returns the digest with digital signature to the user. Here, the information that is returned to the user is referred to as a "time stamp token". Then, later, when the user wishes to prove the existence of the digital data at a certain time, the user transmits the digest of the digital data having a time stamp added thereto to the time stamp authority to thereby request verification of the time stamp. The time stamp authority, receiving the request, verifies the time stamp that is transmitted, by using digital signature. In this manner, the user can prove that the digital data already existed at the certain time.

However, the time stamp is not necessarily valid permanently and can be invalidated. Invalidation of time stamp may or may not be anticipated. Invalidation of time stamp that can be anticipated is expiration of a valid period. Specifically, because the expiration date is established for the private key itself that is used for generating a time stamp by the time stamp authority, the expiration date naturally exists for the time stamp as well. On the other hand, invalidation of time stamp that cannot be anticipated includes: a case where the private key of a time stamp authority has leaked out; a case where a certificate authority that issued the private key to the time stamp authority is in a critical situation; a case where the signature algorithm in the time stamp authority is in a critical state, and so on.

In the former case, because the expiration date of the time stamp can be known in advance, expiration of the valid period can be dealt with easily by obtaining the time stamp once again before expiration. In the latter case, on the other hand, it is not possible to predict leakage of the private key of the time stamp authority or crisis of the certificate authority or the like. Therefore, the unanticipated invalidation of time stamp cannot be dealt with easily. Consequently, when leakage of the private key of the time stamp authority or the like occurs, the time stamp becomes invalidated, making it impossible to certify the time at which the digital data exists. As such, when the time stamp is invalidated in an unanticipated manner, the time at which the digital data exists, in other words, the time at which the time stamp was applied, cannot be verified accurately.

However, there may be cases where requirements for the time certification can be satisfied only by verifying that the time stamp was applied in a certain time width, rather than at an exact time. It is therefore advantageous that such a time width can be verified.

SUMMARY

According to an aspect of the invention, an information processing system includes: a plurality of time stamp authorities that generate a time stamp in accordance with a time stamp request and return the time stamp to a source that issues the request; a selection unit that selects, among the plurality of time stamp authorities, a time stamp authority to which a request for generation of a time stamp to be applied to digital data is to be transmitted, the time stamp authority to be selected is different from a time stamp authority selected in a last selection process which has been performed; an acquisition unit that acquires the time stamp to be applied to the digital data by transmitting the time stamp request including a hash value calculated based on the digital data to the selected time stamp authority; a generation unit that generates link information specifying an order in which time stamps that have been acquired by the acquisition unit were acquired; a storage controller that causes verification information including the time stamp, identification information of the time stamp authority from which the time stamp is acquired, link information generated by the generation unit based on the time stamp, that are associated with each other, to be stored in a memory; a reception unit that receives a time stamp verification request with regard to digital data; and a verification unit that compares an invalidated time stamp applied to digital data to be verified with a time stamp stored in the memory to thereby specify a time range in which the invalidated time stamp is applied.

BRIEF DESCRIPTION OF THE DRAWINGS

An exemplary embodiment of the present invention will be described in detail based on the following figures, wherein:

FIG. 11 is a view showing an example structure of verification information data registered in a verification information database in the present exemplary embodiment.

DETAILED DESCRIPTION

An exemplary embodiment of the present invention will be described in detail with reference to the accompanying drawings.

Figure 1:
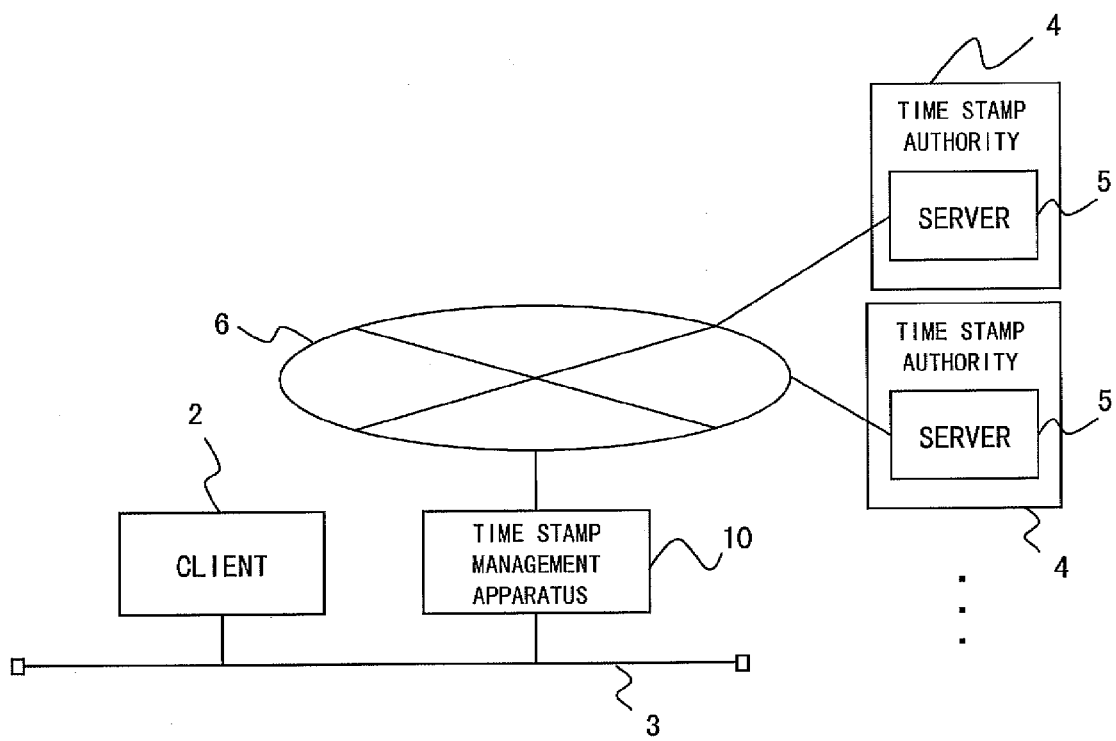
FIG. 1 is a view showing an overall structure of a time stamp verification system according to one exemplary embodiment of the present invention.

FIG. 1 is a view showing an overall structure of a time stamp verification system according to one exemplary embodiment of the present invention. FIG. 1 shows a time stamp management apparatus 10, a client 2 that provides a request for application and verification of a time stamp to the time stamp management apparatus 10 via a LAN (Local Area Network) 3, servers 5 respectively placed in plural time stamp authorities 4 that apply a time stamp in accordance with a transmitted time stamp request, via a WAN (Wide Area Network), from the time stamp management apparatus 10. The client 2 is implemented by a computer, such as a personal computer (PC), that provides a document file to which a time stamp is to be applied and that is used by a user. In FIG. 1, only one client is shown for the sake of convenience. Further, the existing time stamping servers can be used as they are as the servers 5.

Here, a time stamp refers to data in which the time and date when a file was created is recorded. General file systems are configured to record the time and date when a file was created, the time and date when a file was modified, and so on, as attribute information of a digital data file. The "time stamp" as used in the present exemplary embodiment, however, refers to data in which the time officially certificated by the time stamp authority 4 is recorded, rather than the data that is processed as attribute information of a file as described above.

Figure 2:
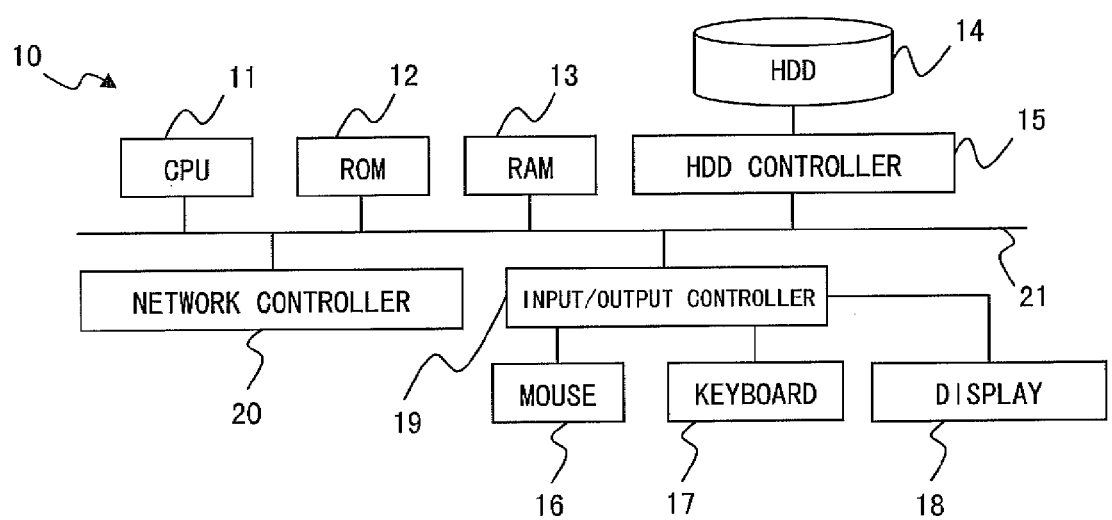
FIG. 2 is a view showing a hardware structure of a time stamp management apparatus according to the exemplary embodiment.

FIG. 2 is a view showing a hardware structure of the time stamp management apparatus 10 according to the present exemplary embodiment. The time stamp management apparatus 10 of the present exemplary embodiment is implemented by a server computer and can be implemented with a general-purpose hardware structure conventionally known. More specifically, as shown in FIG. 2, the time stamp management apparatus 10 includes a CPU 11, a ROM 12, a RAM 13, a hard disk drive (HDD) controller 15 connected to a hard disk drive 14, a mouse and a keyboard provided as an input means, a display 18 provided as a display device, an input and output controller 19 connecting with the mouse 16, the keyboard 17, and the display 18, and a network controller 20 provided as a communication means, that are all connected to an internal bus 21.

Here, because both the server 5 and the client 2 are also computers, their hardware structures can also be shown in the same manner as shown in FIG. 2, though there may be a difference with regard to performance.

Figure 3:
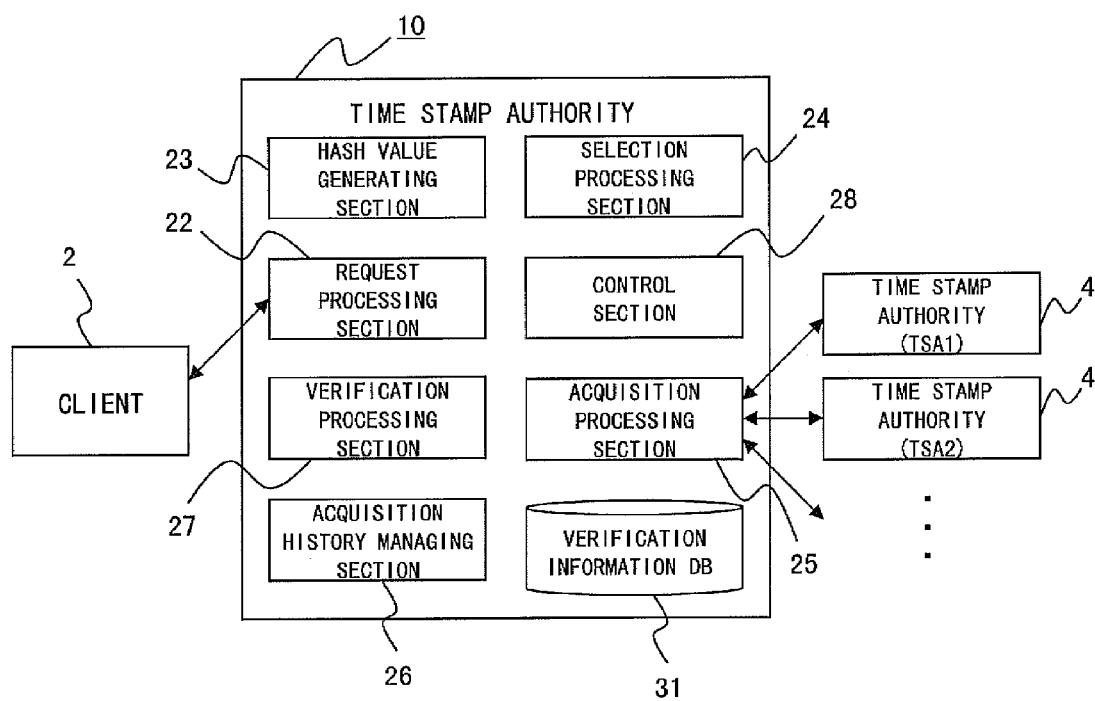
FIG. 3 is a block structural view of a time stamp management apparatus according to the exemplary embodiment.

FIG. 3 is a block diagram showing a structure of the time stamp management apparatus 10 in the present exemplary embodiment. The time stamp management apparatus 10 includes a request processing section 22, a hash value generating section 23, a selection processing section 24, an acquisition processing section 25, an acquisition history managing section 26, a verification processing section 27, and a control section 28. The request processing section 22 receives various requests transmitted from the client 2, including a time stamp application request, a verification request, and so on, and also returns a processing result in accordance with a request. The hash value generating section 23 calculates, when a time stamp application is requested, a hash value on the basis of a document file transmitted from the client 2 to which a time stamp is to be applied. The selection processing section 24 performs a selection process for selecting, among multiple time stamp authorities 4, a time stamp authority to which generation of a time stamp to be applied to the document file is requested. The acquisition processing section 25 transmits the time stamp request including the hash value thus calculated to the time stamp authority selected by the selection processing section 24, thereby acquiring a time stamp to be applied to the digital data. The acquisition history managing section 26 performs a link information generating process for calculating link information that can specify an order in which the stamps that have been acquired from the acquisition processing section 25 up to the present time were acquired. The acquisition history managing section 26 associates the information that specifies digital data, the time stamp applied to the digital data, identification information of the time stamp authority 4 from which the time stamp was acquired, and the link information calculated by using the time stamp, with each other to generate verification information, that is to be stored and managed using a verification information database (DB) 31. Here, as the verification information is generated at the time of acquiring the time stamp from the time stamp authority 4, the data structure of the verification information will be described in combination with description of the process thereof. The verification processing section 27, in response to the reception of a verification request transmitted from the client 2 by the request processing section 22, performs a verification process with respect to the document file that is designated. The control section 28 performs the operation control of the whole apparatus in conjunction with the respective structural elements 22 to 27 included in the time stamp management apparatus 10.

Each of the elements 22 to 28 of the time stamp management apparatus 10 is implemented by a cooperative operation of the computer forming the time stamp management apparatus 10 and the program operating on the CPU 11 installed in the computer. Further, the verification information database 31 is implemented in the HDD 14. Here, the verification information database 31 need not necessarily be provided within the time stamp management apparatus 10 as long as the verification information database 31 can be accessed via the network.

Further, the program as used in the present exemplary embodiment can be provided not only through a communication means but also by a computer-readable recording medium storing the program, such as CD-ROMs and DVD-ROMs. The program provided by the communication means or the recording medium is installed into a computer, and the CPU of the computer sequentially executes the installed program, thereby implementing various processes.

Figure 4:
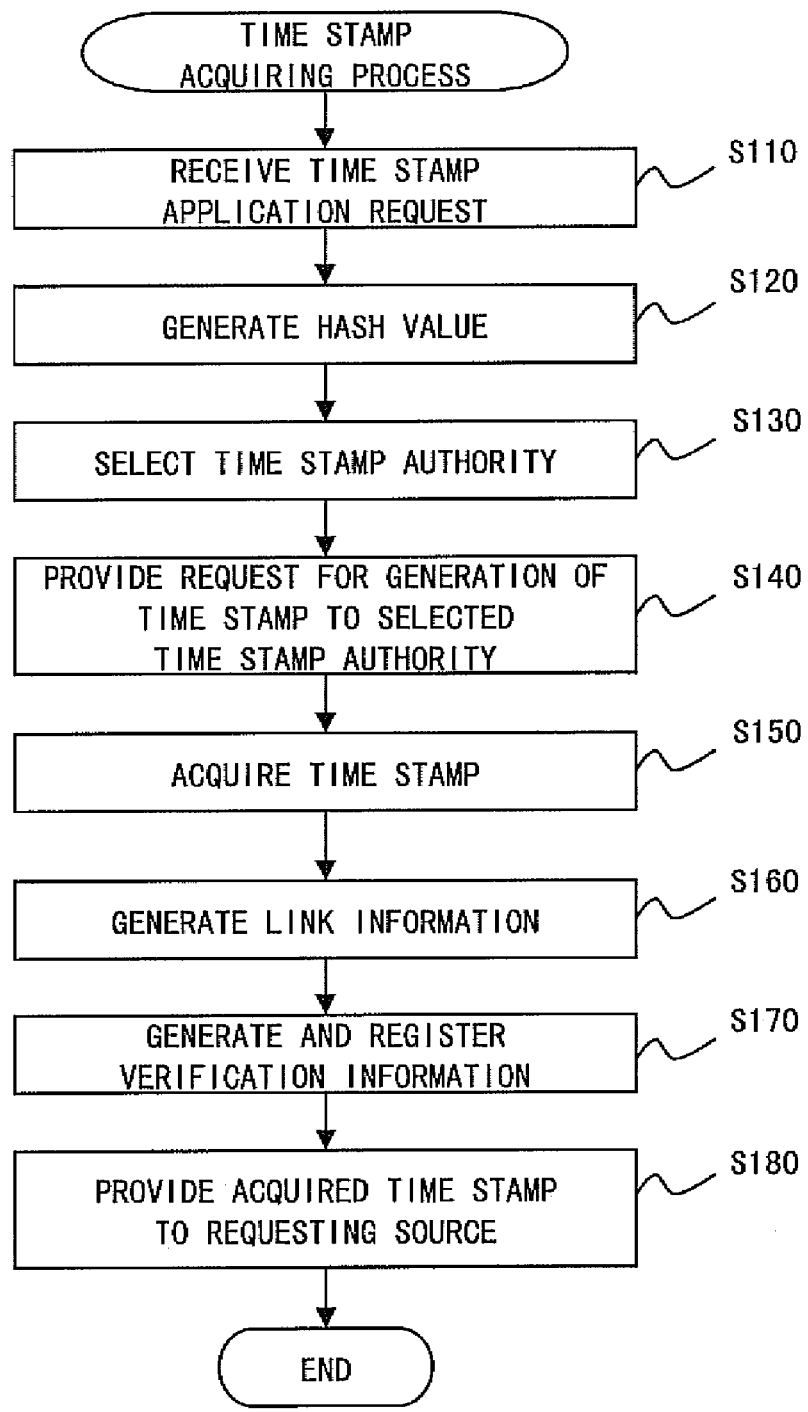
FIG. 4 is a flowchart showing a time stamp acquiring process in the exemplary embodiment.

The operation of the present exemplary embodiment will be described. The operation of the present exemplary embodiment can be roughly categorized into two processes: a process of acquiring a time stamp to be applied to a document file from the time stamp authority 4 and a process of verifying the time stamp applied to the document file. The process of acquiring a time stamp will be described first with reference to the flowchart shown in FIG. 4.

This process starts upon receiving a time stamp application request transmitted from the client 2 by the request processing section 22 (step S110). In this case, a document file to which a time stamp is to be applied is transmitted along with the time stamp application request, or a destination that stores the document file is designated in the time stamp application request. Therefore, the hash value generating section 23 generates a hash value from the document file that is received or obtained from the designated storage destination (step S120). Here, a hash value can be generated using conventional technology. More specifically, assuming that a document file to which a time stamp is to be applied is represented by $D_n$ and a hash function is represented by Hash, a hash value $H_n$ can be found by the following expression:

$$H_n = \text{Hash}(D_n)$$

Here, the hash function refers to an operation technique that is used for generating pseudo-random numbers having a fixed length from a given original text.

Recognizing that a hash value is calculated by the hash value generating section 23, the control section 28 transmits a selection processing request to the selection processing section 24. The selection processing section 24 performs the following selection process in accordance with the selection processing request that is transmitted (step S130). One of the processes characteristics of the present exemplary embodiment is the selection process as will be described below. Specifically, the selection process of the present exemplary embodiment is performed using a selection condition that a time stamp authority 4 that is different from a time stamp authority 4 that was selected in the selection process performed immediately before the current selection process, is selected. The reason why such a selection condition is provided will be described below in conjunction with the description of the verification process. Here, the fundamental concept of the selection condition and the process procedure of the time stamp authority 4 will be described in detail.

As described above, the selection process of the present exemplary embodiment is performed using a selection condition that a time stamp authority 4 different from a time stamp authority 4 that was selected in the selection process performed immediately before the current selection process is selected. In other words, an identical time stamp authority 4 is prevented from being selected successively. Consequently, if there are only two time stamp authorities 4, these authorities are selected alternately. On the other hand, if there are three or more time stamp authorities 4, two or more authorities were not selected in the selection process that was performed immediately before the present process. Namely, there are two more selection candidates. In the present exemplary embodiment, a selection criterion that determines which of these selection candidates is selected is further provided, in addition to the selection condition described above. According to the present exemplary embodiment, a concept of similarity is adopted as this selection criterion.

For example, when there are three time stamp authorities 4 (whose identification codes are "TSA1", "TSA2", and "TSA3", respectively), it is assumed that the time stamp authority "TSA1" was selected in the selection process that was performed immediately before the present process. In this case, in the selection process to be performed next, the time stamp authorities "TSA2" and "TSA3" are obviously selection candidates. According to the present exemplary embodiment, in such a case, the similarity between the time stamp authority 4 that was selected immediately before and each of the remaining selection candidate time stamp authorities 4 is calculated. Specifically, in this example, the similarity between "TSA1" and "TSA2" and the similarity between "TSA1" and "TSA3" are calculated, and the time stamp authority 4 that is less similar, i.e. with a smaller similarity, with respect to "TSA1" is selected. In the present exemplary embodiment, the fundamental principle of the selection condition, that a time stamp authority with a smaller similarity is selected, is established. Here, even when there are only two time stamp authorities 4, this fundamental principle is effective.

When only the above selection condition is set, however, there is a possibility that specific two authorities are selected alternately. The reason for this will be described below.

For example, it is assumed that the time stamp authority "TSA1" was selected in the selection process performed immediately before the present process. Here, assuming (the similarity between "TSA1" and "TSA2")>(the similarity between "TSA1" and "TSA3"), as a results of a selection process, the time stamp authority "TSA3" having a smaller similarity is selected. In the selection process to be performed next, the selection candidates are time stamp authorities "TSA1" and "TSA2". In this case, if (the similarity between "TSA3" and "TSA2")>(the similarity between "TSA3" and "TSA1") is satisfied, the time stamp authority "TSA1" having a smaller similarity is to be selected as a result of a selection process. Then, after the time stamp authority "TSA1" is selected, in the selection process to be performed next, the time stamp authority "TSA3" is to be selected in the same manner as the first selection process. As such, the time stamp authorities "TSA1" and "TSA3" are selected alternately.

On the other hand, assuming that the relationship of (the similarity between "TSA3" and "TSA1")>(the similarity between "TSA3" and "TSA2") is satisfied, after the time stamp authority "TSA3" is selected, the time stamp authority "TSA2" is to be selected as a result of a selection process. In the selection process to be performed next, the selection candidates are time stamp authorities "TSA1" and "TSA3". Here, as is clear by referring to the selection result in each of the above selection processes, the relationship of (the similarity between "TSA2" and "TSA1")>(the similarity between "TSA2" and "TSA3") is satisfied. Consequently, in this case, the time stamp authorities "TSA2" and "TSA3" will be selected alternately.

As described above, when only the parameter of similarity is set as the selection condition, two specific authorities will be selected alternately. While, in the above example, a case of three authorities is described for the convenience of explanation, two specified authorities will similarly be selected alternately in cases of four or more authorities. Accordingly, in the present exemplary embodiment, a parameter of similarity sum is further set as a selection condition so as to obviate the above situation, such that a time stamp authority 4 that is not similar is selected while preventing a situation where only specific time stamp authorities 4 are selected.

The selection process in the present exemplary embodiment will be described.

In the present exemplary embodiment, three types of attribute information, i.e. a certificate ID, a signature algorithm, and a route (or path) to a certificate authority that issues a certificate, are used as parameters for calculating the similarities among time stamp authorities.

Here, assuming that the similarity between certificate IDs of the time stamp authorities that are objects of similarity calculation is x, the similarity between signature algorithms is y, and the similarity between paths to the certificate authority that issues certificates is z, the similarity A between the time stamp authorities can be represented by the following expression:

$$A = (k*x + l*y + m*z)/(k+l+m) \tag{1}$$

In the above expression, each of k, l, and m are weight factors of x, y, and z, respectively. Further, the certificate ID is identification information that is determined uniquely due to a combination of an issuer and a serial number of a certificate. Here, assuming k=l=m=1 so as to achieve uniform weighting, the above expression (1) can be represented as follows:

$$A=(x+y+z)/3 \qquad (2)$$

Here, the attribute information will be described individually.

First, with regard to the similarity x of the certificate ID, if the certificate IDs of the respective time stamp authorities that are similarity calculation objects are identical with each other, the similarity is 1, and otherwise the similarity is 0.

With regard to the similarity y of the signature algorithm, if the signature algorithms of the respective time stamp authorities that are similarity calculation objects are identical with each other, the similarity is 1, and otherwise the similarity is 0.

The similarity z of the path to the certificate authority that issues a certificate is calculated by the following expression:

$$z=g(TSA\_P,TSA\_Q)/f(TSA\_P,TSA\_Q) \qquad (3)$$

Here, g (TSA_P, TSA_Q) is the number of common certificate authorities in the certificate authority path of the time stamp authority "TSA_P" and the certificate authority path of the time stamp authority "TSA_Q", and f(TSA_P, TSA_Q) is a minimum value of the number of certificate authorities that establish the certificate authority path of the time stamp authority "TSA_P" and the number of certificate authorities that establish the certificate authority path of the time stamp authority "TSA_Q". A specific example of this similarity z will be described.

Figure 5:
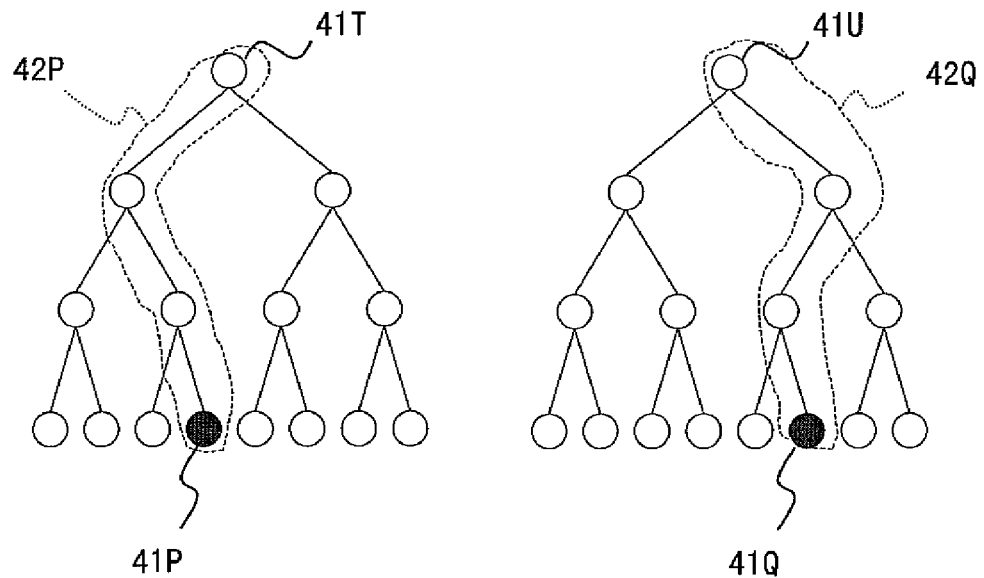
FIG. 5 is a conceptual view showing an example certificate authority path in a time stamp authority.

FIG. 5 is a conceptual view showing the certificate authority paths of the time stamp authorities "TSA_P" and "TSA_Q", respectively. In FIG. 5, the certificate authorities each shown by a circle are coupled with each other by a line to thereby clearly indicate a hierarchical relationship. Among these certificate authorities, certificate authorities 41P and 41Q issue certificates to the time stamp authorities "TSA_P" and "TSA_Q", respectively, and certificate authorities 41T and 41U are parent certificate authorities located at the top level of the time stamp authorities "TSA_P" and "TSA_Q", respectively. Further, the respective groups of certificate authorities enclosed by dotted lines 42P and 42Q, respectively, constitute certificate authority paths for the respective time stamp authorities "TSA_P" and "TSA_Q". In accordance with the certificate authority paths shown in FIG. 5, the certificate authority path of each time stamp authority "TSA_P", "TSA_Q" includes no common certificate authorities among the four-level hierarchy, and is therefore a completely independent path. Accordingly, the relationship of g (TSA_P, TSA_Q)=0 can be satisfied. Further, because the number of certificate authorities constituting the certificate authority path is four for both the time stamp authorities "TSA_P" and "TSA_Q", the minimum value is 4. Therefore, the relationship of f (TSA_P, TSA_Q)=4 is satisfied. Consequently, the similarity z in the example shown in FIG. 5 can be obtained from the above expression (3), as follows:

$$z=0/4=0$$

Figure 6:
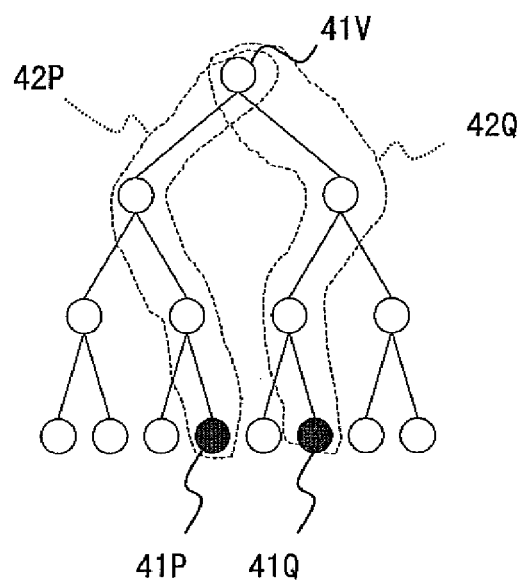
FIG. 6 is a conceptual view showing another example certificate authority path in a time stamp authority.

FIG. 6 is a conceptual view showing certificate authority paths for the time stamp authorities "TSA_P" and "TSA_Q", respectively, and shows an example that is different from the example shown in FIG. 5. In the example shown in FIG. 6, in the certificate authority paths for the time stamp authorities "TSA_P" and "TSA_Q", only the parent certificate authority 41V located at the top level is common for both paths, and the number of certificate authorities constituting the certificate authority path is four for both the time stamp authorities "TSA_P" and "TSA_Q". Accordingly, the similarity z in the example shown in FIG. 6 can be found from the above expression (3) as follows:

$$z=1/4=0.25$$

Figure 7:
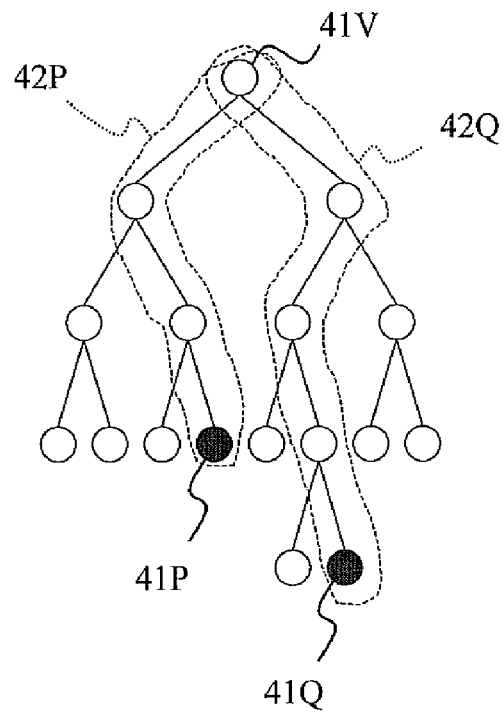
FIG. 7 is a conceptual view showing still another example certificate authority path in a time stamp authority.

FIG. 7 is a conceptual view showing certificate authority paths for the time stamp authorities "TSA_P" and "TSA_Q", respectively, and shows a further example that is different from the examples shown in FIGS. 5 and 6. In the example shown in FIG. 7, in the certificate authority paths for the time stamp authorities "TSA_P" and "TSA_Q", only the parent certificate authority 41V located at the top level is common for both paths, and the number of certificate authorities constituting these certificate authority paths is four for the time stamp authority "TSA_P" and five for the time stamp authority "TSA_Q", and the minimum value is four. Accordingly, the similarity z in the example shown in FIG. 7 can be found from the above expression (3) as follows:

$$z=1/4=0.25$$

As described above, once the similarities x, y, z concerning the respective attribution information of the time stamp authorities are obtained, by inserting each similarity x, y, and z in the above expression (1), the similarity A between the time stamp authorities that are similarity calculation objects can be calculated.

While, in the present exemplary embodiment, three types of attribute information are used for calculating the similarity, the attribute information for use in calculation is not limited to this example, and attribute information other than the above-described types of attribute information may replace the above attribute information or may be additionally used, in consideration of the characteristics or the like of the time stamp authorities 4. Here, the candidates for the attribute information of the time stamp to be used for calculation of the similarity are preferably selected from the information included in the certificate property, similar to the certificate ID or the like.

As described earlier, while the present exemplary embodiment is characterized by the use of similarity for selection of a time stamp authority, a parameter of similarity sum is further provided, because there may occur a disadvantage that only specified time stamp authorities are selected alternately when only the similarity is used as a parameter. A selection process on the basis of this similarity sum will be described.

In the selection process on the basis of a similarity sum, the order in which the time stamp authorities 4 are to be used is determined in advance with reference to the attribute information of the time stamp authorities 4, and selection of the time stamp authorities 4 is performed in this order.

Figure 8:
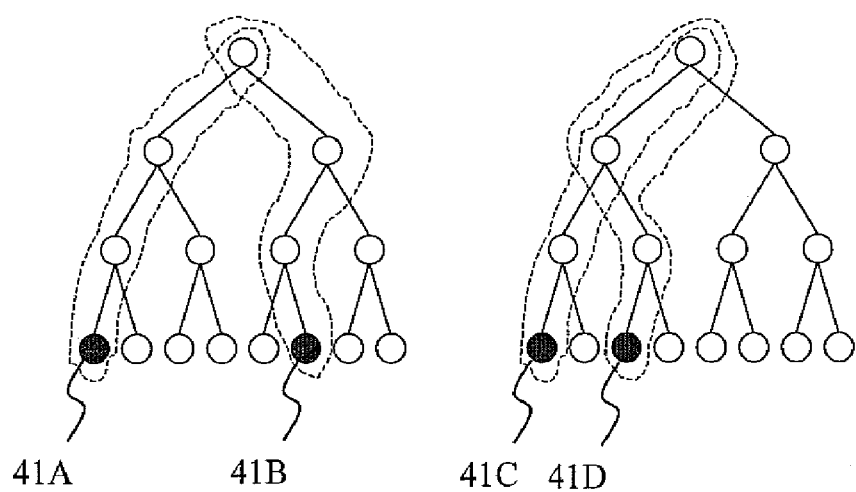
FIG. 8 is a conceptual view showing a further example certificate authority path in a time stamp authority.
Figures 9, 10:
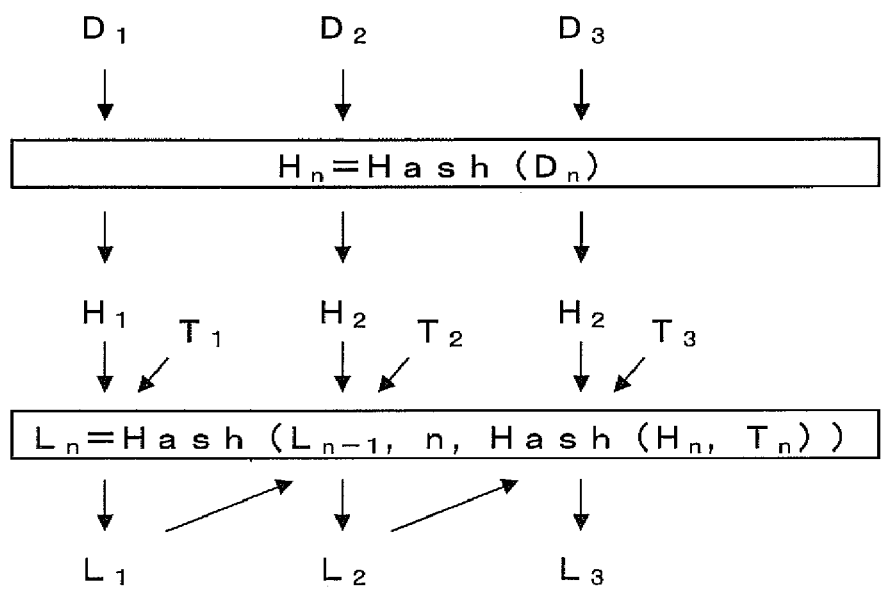
FIG. 9 is a view showing attribute information of certificates issued from a certificate authority to the time stamp authority in the present exemplary embodiment.
FIG. 10 is a view showing a generation method for link information in the present exemplary embodiment.

FIG. 8 is a conceptual view showing the certificate authority paths of the time stamp authorities "TSA_a", "TSA_b", "TSA_c", and "TSA_d", respectively. Further, FIG. 9 is a diagram showing example setting of attribute information of each time stamp authority. Specifically, FIG. 9 shows, in the form of a table, a set value of each attribute information, i.e. ID of an certificate authority that has issued a certificate, a serial number of the certificate, and a signature algorithm, in association with the identification information of the certificate (certificate ID) issued by the certificate authority to the time stamp authority.

For example, as the time stamp authorities 4 that are determined to be selection candidates are to be selected in a sequential order, a circular permutation can be considered. In this case, ((n−1)!) possible permutations can be considered.

Thus, in the case of the four authorities illustrated in FIG. 8, ((4−1)!)=6 different permutations can be considered. In this exemplary embodiment, a permutation having the minimum similarity sum is selected from these six different permutations.

Considering the circular permutation in the order of TSA_a, TSA_b, TSA_c, and TSA_d, and then returning to TSA_a, the similarity sum can be represented by the following:

Similarity sum=similarity (TSA_a−TSA_b)+similarity (TSA_b−TSA_c)+similarity (TSA_c−TSA_d)+similarity (TSA_d−TSA_a). As is obvious from this expression, the similarity sum is calculated by obtaining a sum of a difference in similarities between each time stamp authority and the time stamp authority located immediately thereafter. Here, the similarity sum will be specifically obtained using the certificate authority paths shown in FIG. 8. In this case, the following six different sequences in which the time stamp authorities may be selected are possible:

Permutation 1: TSA_a, TSA_b, TSA_c, TSA_d, TSA_a;
Permutation 2: TSA_a, TSA_b, TSA_d, TSA_c, TSA_a;
Permutation 3: TSA_a, TSA_c, TSA_b, TSA_d, TSA_a;
Permutation 4: TSA_a, TSA_c, TSA_d, TSA_b, TSA_a;
Permutation 5: TSA_a, TSA_d, TSA_b, TSA_c, TSA_a; and
Permutation 6: TSA_a, TSA_d, TSA_c, TSA_b, TSA_a.

Here, the similarity between the time stamp authorities can be calculated according to the above expression (1) as follows:

$$\text{Similarity}(TSA\_a-TSA\_b)=(0+(1/4)+1)/3=5/12;$$

$$\text{Similarity}(TSA\_a-TSA\_c)=(0+(0/4)+1)/3=4/12;$$

$$\text{Similarity}(TSA\_a-TSA\_d)=(0+(0/4)+1)/3=4/12;$$

$$\text{Similarity}(TSA\_b-TSA\_c)=(0+(0/4)+1)/3=4/12;$$

$$\text{Similarity}(TSA\_b-TSA\_d)=(0+(0/4)+1)/3=4/12; \text{ and}$$

$$\text{Similarity}(TSA\_c-TSA\_d)=(0+(2/4)+1)/3=6/12.$$

With these similarities, the similarity sum of each permutation described above can be calculated as follows:

Similarity sum of Permutation 1=5/12+4/12+6/12+4/12=19/12

Similarity sum of Permutation 2=5/12+4/12+6/12+4/12=19/12

Similarity sum of Permutation 3=4/12+4/12+4/12+4/12=16/12

Similarity sum of Permutation 4=4/12+4/12+4/12+5/12=17/12

Similarity sum of Permutation 5=4/12+4/12+4/12+4/12=16/12

Similarity sum of Permutation 6=5/12+4/12+6/12+4/12=19/12

Consequently, the permutations 3 and 5 have the minimum similarity sum, and either the permutation 3 or 5 may be selected because the same advantage can be expected. In this example, the permutation 3 is selected. In the selection process, by selecting the time stamp authorities 4 in the order according to this permutation 3, a smaller similarity compared to the cases of the permutations 1, 2, and 4 can be achieved, and also, the disadvantage that only specific time stamp authorities 4 are selected alternately can be prevented.

Here, referring back to FIG. 4, because the order in which the time stamp authorities 4 are to be selected is determined in advance on the basis of the similarities and the similarity sums as described above, the selection processing section 24, when receiving a selection processing request from the control section 28, selects a time stamp authority 4 to which a request for generation of a time stamp is to be supplied from among a plurality of time stamp authorities 4 in accordance with the selection order thus determined.

When the selection processing section 24 performs a selection process in accordance with a selection processing request and returns an execution result to the control section 28, the control section 28 transmits a hash value and the execution result, i.e. a destination to which generation of a time stamp is requested, to the acquisition processing section 25. The acquisition processing section 25, receiving the hash value or the like from the control section 28, transmits the time stamp request including the hash value to the time stamp authority 4 that is selected by the selection processing section 24, to thereby request the time stamp authority 4 to generate a time stamp (step S140).

The time stamp authority 4 that is selected adds time information to the hash value (the digest) that is transmitted and further applies a digital signature thereto using a private key of the time stamp authority. Then, the time stamp authority 4 returns the digest to which the signature has been applied, i.e. the time stamp. The above process by the time stamp authority 4 can be performed using the existing technology.

When the time stamp is acquired from the time stamp authority 4 in accordance with the time stamp request that is transmitted (step S150), the acquisition history managing section 26 performs a link information generating process to thereby generate link information and further generates verification information including the link information, that is then recorded in the verification information database 31. The process of generating the link information and the process of generating and registering the verification will be described in detail below.

FIG. 10 shows a method of generating link information according to the present exemplary embodiment. Specifically, assuming that a document file to which a time stamp is to be applied is $D_n$, a hash value generated from the document file $D_n$ is $H_n$, a time stamp obtained from the acquisition processing section 25 is $T_n$, and link information calculated by the link information generating process that was performed immediately before the current process is $L_{n-1}$, link information $L_n$ can be represented by the following calculation expression:

$$L_n=\text{Hash}(L_{n-1},n,\text{Hash}(H_n,T_n)) \quad (4)$$

Accordingly, assuming that the document file $D_2$ is an object to which a time stamp is to be applied in the current process, the acquisition history managing section 26 acquires the hash value $H_2$ that is generated from the document file $D_2$ in step S120, the time stamp $T_2$ that is acquired from the acquisition processing section 25, and the link information $L_1$ that is calculated by the link information generating process that was performed immediately before the current process, and inserts each of these values in the above expression (4), thereby obtaining the link information (step S160).

Once the link information can be calculated, the acquisition history managing section 26 subsequently associates the document file $D_2$ to which the time stamp is to be applied, the time stamp $T_2$, and the identification information of the time stamp authority 4, for which the link information $L_2$ and the time stamp $T_2$ are generated, with each other, to thereby generate verification information, and registers the verification information thus generated in the verification information database 31 (step S170). Here, the information that identifies a document file may be information concerning where the document file is stored, rather than a document file $D_n$, that is the substance of the file itself, because it suffices that the document file can be obtained at the time of use. An example data structure of the verification information registered in the verification information database 31 according to the present exemplary embodiment is shown in FIG. 11. The verification information is registered in the verification information database 31 in a sequential order each and every time the time stamp is obtained.

Once the verification information is generated, the control section 28 instructs the request processing section 22 to return the time stamp that is acquired to the client 2 that has issued the processing request (step S180).

The time stamp managing section 10 acquires a time stamp to be applied to a document file as described above. The client user, when they wish to certify existence of a document file at a certain time, transmits the digest of the document file to which a time stamp has been applied to the corresponding time stamp authority, thereby requesting verification of the time stamp. The time stamp authority, receiving the request, performs verification of the time stamp that is transmitted, using digital signature. Thus, the user can certify that the digital data already existed at the certain time.

Figure 12:
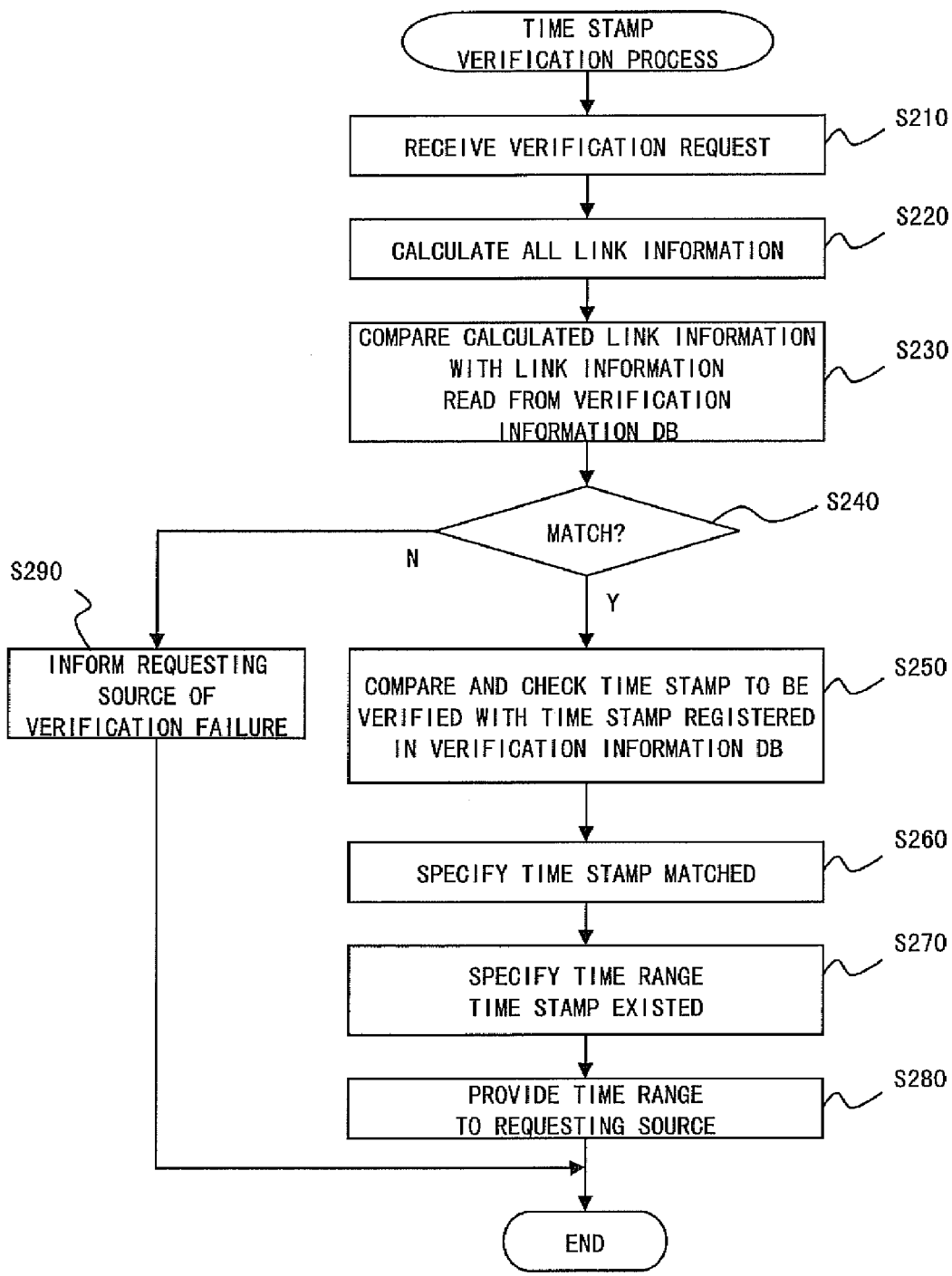
FIG. 12 is a flowchart showing a verification process of the present exemplary embodiment.

Here, when an event of unanticipated invalidation of a time stamp, such as leakage of a private key of a time stamp authority, occurs with regard to a document file to which a time stamp has been applied by that time stamp authority, guarantee of the time when the document file exists becomes no longer possible due to loss of reliability of the time stamp. In the present exemplary embodiment, the verification process which can deal with such a case is performed. The verification process according to the present exemplary embodiment will be described with reference to the flowchart shown in FIG. 12. Here, on the basis of the registered examples shown in FIG. 11, an example event in which occurrence of leakage of a private key of a time stamp authority TSA2, for example, is known to the public and the time stamp $T_2$ applied to the document file $D_2$ can no longer be guaranteed, will be described.

This process is started when the request processing section 22 receives a verification request from the client 2 (step S210). The verification request includes the time stamp $T_2$ that is to be verified and the document file $D_2$ to which the time stamp has been applied. The verification processing section 27 first verifies correctness of the verification information registered in the verification information database 31. Specifically, the verification processing section 27 sequentially reads the verification information from the verification information database 31, and inserts the link information $L_{n-1}$ calculated by the link information generating process that was performed immediately before the current process, n, a hash value $H_n$, and a time stamp $T_n$ into the above expression (4), thereby calculating the link information $L_n$. This calculation process is repeated so that all the link information $L_1$ to $L_n$ registered in the verification information database 31 (step S220) is calculated. This process is equivalent to collective execution of the link information generating processes performed by the acquisition history managing section 26 each time the time stamp is acquired. Here, the initial value $L_0$ that is necessary for calculating the link information $L_1$ is the same as the initial value $L_0$ that is used by the acquisition history managing section 26 for calculating the link information $L_1$. The verification processing section 27 then compares the link information $L_1$ to $L_n$ registered in the verification information database 31 with the link information $L_1$ to $L_n$ calculated in the above step S220 (step S230). Here, if the link information do not match each other (N in step S240), there is a possibility that the verification information registered in the verification information database 31 has been tampered with. In this case, verification of the time stamp $T_2$ cannot be performed, and the verification processing section 27 instructs the request processing section 22 to report the fact of failure of the verification of the time stamp for which a verification request has been provided to the client 2 that has issued a processing request (step S290).

On the other hand, if the link information match each other (Y in step S240), the verification information registered in the verification information database 31 has not been tampered with, and therefore the correctness of the sequential order of the verification information has been certified. The fact that the sequential order of the verification information is correct can further certify that the time stamps $T_1$ to $T_n$ were also generated in the order that the corresponding verification information was registered.

Subsequently, the verification processing section 27 compares, for checking, the time stamp $T_2$ to be verified that is transmitted from the client 2, with the time stamps $T_1$ to $T_n$ registered in the verification information database 31 (step S250). As a result of comparison, the time stamp $T_2$ transmitted from the client 2, if it is a correct time stamp, should match any time stamp, actually the time stamp $T_2$, in the verification information database 31. Thus, it is possible to specify the time stamp that matches the time stamp $T_2$ transmitted from the client 2 (step S260). Here, because the verification request transmitted from the client 2 includes the document file $D_2$, it is also possible to compare this document file $D_2$ with the document file $D_2$ registered in the verification information database 31, thereby specifying the time stamp $T_2$.

In this manner, it is possible to specify the time stamp that matches the time stamp $T_2$ transmitted from the client 2. Here, the correctness of the sequential order of the time stamps $T_1$ to $T_n$ has been certified as described above. Accordingly, it is proved that the data of the time stamp $T_2$ exists between the time stamp $T_1$ generated immediately before the time stamp $T_2$ and the time stamp $T_3$ generated immediately after the time stamp $T_2$. Here, the time stamp authority TSA1 that generated the time stamp $T_1$ and the time stamp authority TSA3 that generated the time stamp $T_3$ are not invalidated and are valid at the current time. Consequently, it is also certified that the time stamps $T_1$ and $T_3$ generated by the time stamp authorities TSA1 and TSA3, respectively, are valid.

More specifically, while the time stamp cannot directly certify the time when the corresponding data exists due to invalidation of the time stamp authority TSA2, it is possible to certify that the time stamp $T_2$ was generated at least between the times that have been certified by the time stamps $T_1$ and $T_3$, respectively, because it has been certified that the time stamp $T_2$ was generated between the time stamps $T_1$ and $T_3$ and also because these time stamps $T_1$ and $T_3$ have been certified by the time stamp authorities TSA1 and TSA3, respectively. Thus, the verification processing section 27 specifies the time range in which the time stamp $T_2$ exists (step S270).

According to the present exemplary embodiment, even when the time stamp $T_2$ cannot be guaranteed due to invalidation of the time stamp authority TSA2, it is possible to certify that the time stamp $T_2$ was generated between the time stamps $T_1$ and $T_3$ certified by other time stamp authorities TSA1 and TSA3, to thereby certify that the time stamp $T_2$ exists in the time span defined between the times stamps $T_1$ and $T_3$ immediately before and after the time stamp $T_2$.

Once the time range in which the time stamp $T_2$ exists is specified as described above, the verification processing section 27 instructs the request processing section 22 to provide the time range in which the time stamp that is an object of the verification request exists to the client 2 that issues the processing request (step S280).

According to the present exemplary embodiment, even when the time stamp $T_2$ cannot be guaranteed due to invalidation of the time stamp authority TSA2, the reliability of the time stamps $T_1$ and $T_3$ immediately before and after the time stamp $T_2$ that are generated by the time stamp authorities TSA1 and TSA3 is effectively used to specify the time span in which the time stamp $T_2$ that cannot be guaranteed exists and also certify its existence. Here, if the time stamp authority TSA3 is also invalidated, the correctness of the time stamp $T_3$ cannot be similarly guaranteed, and therefore the reliability of the time stamp $T_4$ is then to be effectively used. Consequently, the time width in which the time stamp $T_2$ exists is increased from the range of $T_1$ to $T_3$ to the range of $T_1$ to $T_4$.

Here, it is assumed, for example, that the similarity between the time stamp authorities TSA2 and TSA3 is high because the signature algorithms of these time stamp authorities TSA2 and TSA3 are identical. In this case, when the time stamp authority TSA2 is invalidated as in the above example, it is more likely that the time stamp authority TSA3 having a higher similarity with respect to the time stamp authority TSA2 is similarly invalidated than other time stamp authorities having a lower similarity. In other words, there is a possibility that the time stamp $T_3$ generated by the time stamp authority TSA3 cannot be guaranteed either. If the time stamp authority TSA3 is invalidated, the time span in which the time stamp $T_2$ exists increases to range of $T_1$ to $T_4$.

In the selection process according to the present exemplary embodiment, when the selection processing section 24 selects the time stamp authority 4 to which a request for generating the time stamp is provided among plural candidates, the parameter of similarity is considered, as described above. If the selection of the time stamp authority is performed taking no consideration of the similarity between the time stamp authorities to thereby select the time stamp authorities having a high similarity with respect to each other in a consecutive manner, it is very likely that the time span in which the target time stamp exists increases, as described above. In order to overcome this disadvantage, according to the present exemplary embodiment, the parameters of the similarity and the similarity sum are considered in the selection process, so that the time stamp authority 4 that is not only different from the time stamp authority 4 that was selected in the selection process immediately before the present process but also has a low similarity with respect to both the time stamp authorities 4 immediately before and after the subject time stamp authority 4 can be selected. Here, by selecting the time stamp authority 4 having a low similarity with respect to the time stamp authority selected immediately before, the time stamp authority 4 having a low similarity with respect to both the time stamp authorities immediately before and after the subject time stamp authority can be selected.

In the present exemplary embodiment, at the time of selecting the time stamp authority to which a request for generation of a time stamp is provided during the selection process, the circular permutation is considered and the order of selecting the time stamp authorities is previously determined on the basis of the circular permutation having the minimum similarity sum. It should be noted, however, that this selection order is determined when all the time stamp authorities are in a valid state. Accordingly, when any one of the time stamp authorities is invalidated, the similarity sum can be calculated once again with the invalidated time stamp authority being excluded to thereby determine the order of selecting the time stamp authorities once again.

The hardware structure shown in FIG. 2 is only one example, and the present exemplary embodiment is not limited to this structure and may be any structure that functions as described above. For example, a program may be installed in a mobile telephone, a portable information terminal, a copying machine, a facsimile machine, a scanner, a printer, a multi-function copying machine (a device having a combined function of a scanner, a printer, a copying machine, facsimile or the like), and so on, as well as a personal computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical application, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An information processing system, comprising:
   a plurality of time stamp authorities that generate time stamps in accordance with time stamp requests and return the time stamps to sources that issue the requests;
   a selection unit that selects, among the plurality of time stamp authorities, a time stamp authority to which a request for generation of a time stamp to be applied to digital data is to be transmitted, the time stamp authority selected being different from a time stamp authority selected in a last selection process;
   an acquisition unit that acquires the time stamp to be applied to the digital data by transmitting the time stamp request including a hash value calculated based on the digital data to the selected time stamp authority;
   a generation unit that generates link information specifying an order in which time stamps have been acquired by the acquisition unit;
   a storage controller that causes verification information including the time stamp, identification information of the time stamp authority from which the time stamp is acquired, and link information generated by the generation unit based on the time stamp, that are associated with each other, to be stored in a memory;
   a reception unit that receives a time stamp verification request, regarding the digital data, for verification of an invalidated time stamp, wherein the invalidated timestamp is known to be generated by an invalidated time stamp authority; and
   a verification unit that specifies a time stamp in the memory that matches the invalidated time stamp, wherein the verification unit uses times certified by valid time stamps that were last acquired before the specified time stamp and first acquired after the specified time stamp, respectively, to verify a start and end of a time range in which the invalidated time stamp was applied.

2. A computer readable storage device storing a program causing a computer to execute a process, the process comprising:
   selecting, among a plurality of time stamp authorities, a time stamp authority to which a request for generation of a time stamp to be applied to digital data is to be transmitted, the time stamp authority selected being different from a time stamp authority selected in a last selection process;

acquiring the time stamp to be applied to the digital data by transmitting the time stamp request including a hash value calculated based on the digital data to the selected time stamp authority;

generating link information specifying an order in which time stamps have been acquired;

storing, in a memory, verification information including the time stamp, identification information of the time stamp authority from which the time stamp is acquired, and link information generated based on the time stamp, that are associated with each other;

receiving a time stamp verification request, regarding the digital data, for verification of an invalidated time stamp, wherein the invalidated timestamp is known to be generated by an invalidated time stamp authority;

specifying a time stamp in the memory that matches the invalidated time stamp; and using times certified by valid time stamps that were last acquired before the specified time stamp and first acquired after the specified time stamp, respectively, to verify a start and end of a time range in which the invalidated time stamp was applied.

3. The storage device according to claim 2, wherein the process further comprises:

calculating a similarity between each of the plurality of time stamp authorities based on attribute information of the plurality of time stamp authorities; and selecting a time stamp authority that is different from a time stamp authority selected in the last selection process and that also has a least similarity with respect to the time stamp authority selected in the last selection process.

4. The storage device according to claim 3, wherein the process further comprises:

forming circular permutations that allow all of a plurality of time stamp authorities to be selected, calculating a similarity between two consecutive time stamp authorities in each circular permutation and summing the similarities to obtain a similarity sum of each circular permutation, and, when a circular permutation having a minimum similarity sum is specified, selecting the time stamp authorities in a sequential order determined in the circular permutation that is specified.

5. A computer readable storage device storing a program causing a computer to execute a process, the process comprising:

storing, in a memory, verification information including a time stamp applied to digital data, identification information of a time stamp authority from which the time stamp is acquired, wherein the time stamp authority that the time stamp is acquired from is different than a time stamp authority used to acquire a last acquired time stamp, and link information for specifying an order in which time stamps have been acquired, that are associated with each other;

receiving a time stamp verification request, regarding the digital data, for verification of an invalidated time stamp, wherein the invalidated timestamp is known to be generated by an invalidated time stamp authority;

specifying a time stamp in the memory that matches the invalidated time stamp; and using times certified by valid time stamps that were last acquired before the specified time stamp and first acquired after the specified time stamp, respectively, to verify a start and end of a time range in which the invalidated time stamp was applied.

6. The storage device according to claim 5, wherein the process further comprises:

on receiving a time stamp verification request, generating link information and comparing the generated link information with the stored link information.

7. An information processing apparatus, comprising:

a selection unit that selects, among a plurality of time stamp authorities, a time stamp authority to which a request for generation of a time stamp to be applied to digital data is to be transmitted, the time stamp authority selected being different from a time stamp authority selected in a last selection process;

an acquisition unit that acquires the time stamp to be applied to the digital data by transmitting the time stamp request including a hash value calculated based on the digital data to the selected time stamp authority;

a generation unit that generates link information specifying an order in which time stamps have been acquired by the acquisition unit;

a storage controller that causes verification information including the time stamp, identification information of the time stamp authority from which the time stamp is acquired, and link information generated by the generation unit based on the time stamp, that are associated with each other, to be stored in a memory;

a reception unit that receives a time stamp verification request, regarding the digital data, for verification of an invalidated time stamp, wherein the invalidated timestamp is known to be generated by an invalidated time stamp authority; and a verification unit that specifies a time stamp in the memory that matches the invalidated time stamp, wherein the verification unit uses times certified by valid time stamps that were last acquired before the specified time stamp and first acquired after the specified time stamp, respectively, to verify a start and end of a time range in which the invalidated time stamp was applied.

8. An information processing apparatus, comprising:

a storage controller that causes verification information including a time stamp applied to digital data, identification information of a time stamp authority from which the time stamp is acquired, wherein the time stamp authority that the time stamp is acquired from is different than a time stamp authority used to acquire a last acquired time stamp, and link information for specifying an order in which time stamps have been acquired, that are associated with each other, to be stored in a memory;

a reception unit that receives a time stamp verification request, regarding the digital data, for verification of an invalidated time stamp, wherein the invalidated timestamp is known to be generated by an invalidated time stamp authority; and a verification unit that specifies a time stamp in the memory that matches the invalidated time stamp, wherein the verification unit uses times certified by valid time stamps that were last acquired before the specified time stamp and first acquired after the specified time stamp, respectively, to verify a start and end of a time range in which the invalidated time stamp was applied.

9. An information processing method, comprising:

selecting, among a plurality of time stamp authorities, a time stamp authority to which a request for generation of a time stamp to be applied to digital data is to be transmitted, the time stamp authority selected being different from a time stamp authority selected in a last selection process;

acquiring the time stamp to be applied to the digital data by transmitting the time stamp request including a hash value calculated based on the digital data to the selected time stamp authority;

generating link information specifying an order in which time stamps have been acquired;

storing, in a memory, verification information including the time stamp, identification information of the time stamp authority from which the time stamp is acquired, and link information generated based on the time stamp, that are associated with each other;

receiving a time stamp verification request, regarding the digital data, for verification of an invalidated time stamp, wherein the invalidated timestamp is known to be generated by an invalidated time stamp authority;

specifying a time stamp in the memory that matches the invalidated time stamp; and using times certified by valid time stamps that were last acquired before the specified time stamp and first acquired after the specified time stamp, respectively, to verify a start and end of a time range in which the invalidated time stamp was applied.

10. The method according to claim 9, further comprising:

calculating a similarity between each of the plurality of time stamp authorities based on attribute information of the plurality of time stamp authorities; and selecting a time stamp authority that is different from a time stamp authority selected in the last selection process and that has a that also has a least similarity with respect to the time stamp authority selected in the last selection process.

11. The method according to claim 10, further comprising:

forming circular permutations that allow all of a plurality of time stamp authorities to be selected, calculating a similarity between two consecutive time stamp authorities in each circular permutation and summing the similarities to obtain a similarity sum of each circular permutation, and, when a circular permutation having a minimum similarity sum is specified, selecting the time stamp authorities in a sequential order determined in the circular permutation that is specified.

12. An information processing method, comprising:

storing, in a memory, verification information including a time stamp applied to digital data, identification information of a time stamp authority from which the time stamp is acquired, wherein the time stamp authority that the time stamp is acquired from is different than a time stamp authority used to acquire a last acquired time stamp, and link information for specifying an order in which time stamps have been acquired, that are associated with each other;

receiving a time stamp verification request, regarding the digital data, for verification of an invalidated time stamp, wherein the invalidated timestamp is known to be generated by an invalidated time stamp authority;

specifying a time stamp in the memory that matches the invalidated time stamp; and using times certified by valid time stamps that were last acquired before the specified time stamp and first acquired after the specified time stamp, respectively, to verify a start and end of a time range in which the invalidated time stamp was applied.

13. The method according to claim 12, further comprising:

on receiving a time stamp verification request, generating link information and comparing the generated link information with the stored link information.

* * * * *